S. CHESTER.
Fire-Alarm Signal-Box.
No. 164,425.   Patented June 15, 1875.
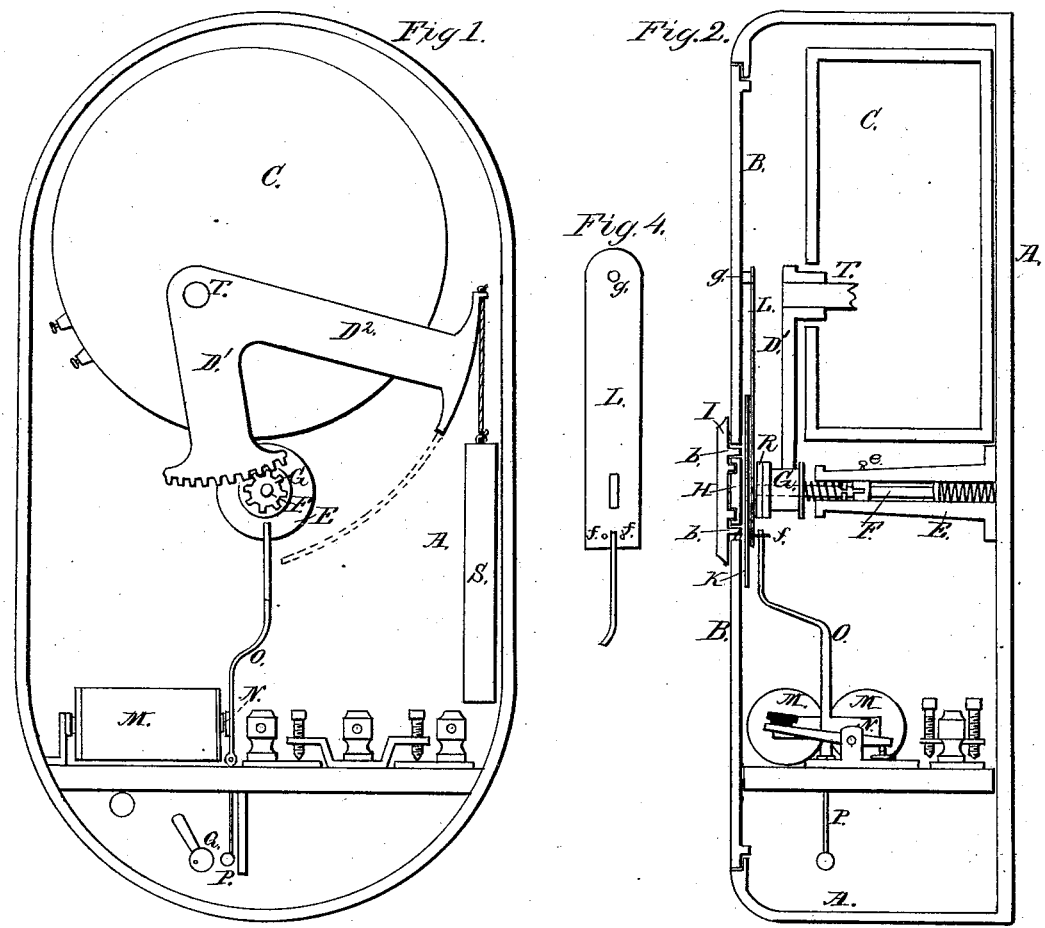
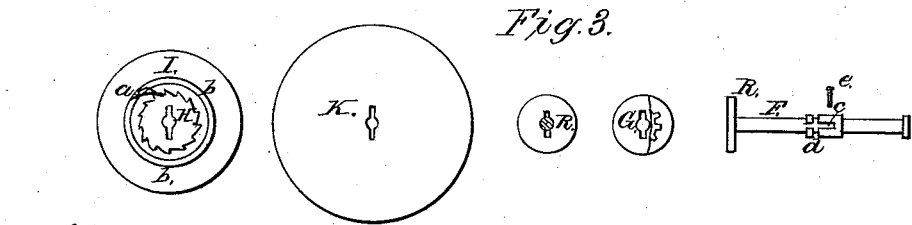
Witnesses.   Inventor.

UNITED STATES PATENT OFFICE.

STEPHEN CHESTER, OF ELIZABETH, NEW JERSEY.

IMPROVEMENT IN FIRE-ALARM SIGNAL-BOXES.

Specification forming part of Letters Patent No. 164,425, dated June 15, 1875; application filed December 21, 1874.

*To all whom it may concern:*

Be it known that I, STEPHEN CHESTER, of Elizabeth, State of New Jersey, have invented an Improvement in Fire-Alarm Telegraph, of which the following is a specification:

My invention consists of certain improved form of apparatus for the transmission of fire-alarm or other electro-telegraphic signals, and their application, in connection with lines and receiving apparatus, to signal-telegraphy.

Sheet No. 1, drawing attached, shows a plan, section, and various detached parts of an automatic signal-box, designed especially for the streets from whence specific and fixed signals may be sent to a central office, to engine and police stations, or may be sounded upon great bells.

I will first describe the street or signal box shown upon Sheet No. 1. This consists of an oval shell of metal, (see Figure 1,) with rounded corners or edges, as shown in the sectional view, Fig. 2. This contains, first, an interior or inclosed box, C, containing any combination of gear-work or machinery capable of causing any electrical circuit closing and breaking devices to move with uniform speed when the weight or spring necessary to produce motion shall be attached thereto, and shall be wound up; also, the apparatus required to wind up this machinery—lightning-arrester, Morse key-magnet, and all apparatus that may be desired in boxes designed for fire-alarm purposes.

It has been customary to use clock-springs inclosed within this circular box C for impelling the said machinery, which, in very cold weather, are liable to fracture, or to inequality of motive force, when subjected to greatly-varying degrees of temperature; hence, in many parts of the country demands have been made to have weights substituted to drive the machinery, which operate outside the box C. The objection to this latter mode of propulsion has been that the method of winding up the machinery has been such that the weight would be raised with a sudden impulsive motion, frequently catching in the upper corner of the box, or its attachment to the arm $D^2$ would be broken. This difficulty would be obviated if the method of winding were such that the weight would be raised with a steady and uniform motion.

In Sheet No. 1 of annexed drawings, G, Figs. 1, 2, 3, is a pinion, the teeth of which engage in the teeth upon the end of the arm $D^1$, which forms part of the piece $D^1 D^2$, which is fixed upon the end of the shaft T, which is the axis of the driving-wheel of the machinery in box C. The pinion G, which is inclosed between two blank-wheels of somewhat larger diameter firmly attached to it, is not fixed to the shaft F, Figs. 1, 2, and 3, but plays loosely upon it. E is a standard fixed to the bottom of the box A, having a longitudinal hole in its axis, in which the shaft F plays freely. Underneath this shaft is a spiral spring, forcing the shaft outward. It is prevented, however, from coming entirely out of this hole by the screw $e$, the point of which, when placed in position, enters the short longitudinal groove $c$, Fig. 3, thus permitting a longitudinal motion to the shaft F, limited by the length of the groove $c$. At a suitable point, $d$, a transverse groove of the same size and depth surrounds the shaft F; hence, if the shaft be pressed downward until the groove $d$ be precisely opposite the point of the screw or pin $e$, the shaft may revolve, but in no other position is revolution possible. Moreover, if the shaft F be thus pressed down upon its expelling-spring, and slightly turned, so that the pin-point $e$ engages in the groove $d$, the spring will become inoperative, and the shaft F will not recover its normal position until it be further turned, until the longitudinal groove $c$ again comes opposite the pin-point $e$; hence, if revolution in one direction only be permitted, then if the shaft be turned never so little under the conditions described, the spring will remain inoperative, and the shaft will be held down until a complete revolution be made, when, if the original pressure required to bring the groove $d$ opposite the pin $e$ be discontinued, the shaft will spring back to its normal position. The shaft F is terminated by the blank disk R fixed to it, so that the pinion G, though sliding freely and revolving loosely upon the shaft, cannot escape from it. A supplemental spiral spring may be used to keep the pinion G constantly pressed toward the terminal disk or plate R, in whatever position the shaft may be. In Fig. 2, B represents the door of the metallic case A, in which a hole is left for the introduction of the parts I and H, which are more distinctly shown in Fig. 3. I is a plate resting upon the door, similar to the escutcheon of a key-hole, and performing a similar duty.

Upon this a circular projecting ring, b, of height equal to the thickness of the door, contains a ratchet-wheel, H, Figs. 2 and 3, and the spring or pawl a, Fig. 3, which permits the wheel H to revolve in one direction. A plate K is placed on the inside of the door, which, when screwed to the plate H, fastens the ratchet-wheel in a box, and secures the whole of this apparatus in its proper position opposite the wheel R. Slots or key-holes are cut through the plates I and K, the ratchet-wheel H, the terminal plate R, and finally into the solid end of the pinion G, in size and shape to admit the entrance of a flat key, such as shown in Fig. 5, the wards of which may be varied, in order to have the boxes of different cities operated by different keys. It is evident, then, that if this key, properly formed as regards shape and length, be introduced into the slot or key-hole described, when the machine is in its normal position, it will successively enter the slots or key-holes in H, K, R, and G, and if then pressed upon until the pin or screw e is opposite the groove d, Figs. 2 and 3, that the key may be turned in one direction only. The key being properly formed, this will happen only when pressed home until the shoulder of the handle of the key rests upon the covering-plate I. If the key be too short or too long, the groove d will not be brought in line with the pin e, and hence the key could not be turned in any direction, nor could any effect be produced on the interior machinery of the box. It is equally evident that if the proper key be introduced and turned in the only direction permitted by the ratchet-wheel H, it will cause the weight S to be raised, or an equivalent effect be produced if a spring be used. Also, it is evident that the key must make an entire revolution before the pin e can escape from the transverse groove d into the longitudinal groove c of the shaft F. When, however, this revolution has been performed, precisely as one would lock or unlock a lock, if no severe pressure be made upon the key at that moment it will be thrown out by the recovery of the spring under the shaft F, and so soon as the points of the key escape from the slot or key-hole of the pinion, the latter, being entirely free, will be caused to revolve in the opposite direction by the descent of the weight S, and consequent movement of arm D¹, and the key cannot re-engage in the said slot or key-hole until the revolution of the pinion has again brought the key-holes opposite to each other.

It will be observed that this system admits of the addition of numerous complications, rendering the difficulty of forging a false key still more difficult.

It will be understood that the shaft of the key from h to i is round, and from i to the end is flat. The slots K K are like wards, and permit the revolution of the key in the fixed parts I and K, and also fix exactly the penetration of the key before it can turn. The parts of the key marked l and m may have varying widths and relative lengths, so that when the key is introduced to where it may turn, there shall be a limited separation between R, G, and E. Now, if pins project from either end of G, which may engage upon corresponding obstacles upon R and E, when these parts are insufficiently separated, it is evident that no key can turn, except one in which each part is of just width and length.

When the key has once been turned and thrown out, as above described, it is impossible to reintroduce it, or in any way interfere with the evolutions of the interior machinery, until it has completed the functions assigned to it.

A thin plate of metal, L, Figs. 2 and 4, is suspended from a pivot, g, on the door B, in such manner that it swings between the key-hole of K and that of R. This also has a key-hole. Pins f f project from it in such manner that the prolongation O, Figs. 1, 2, and 4, of the armature-lever of the magnet M, Figs. 1 and 2, enters between them, and the swinging plate L is swung backward and forward by the movements of the armature N, in such manner that the key-hole in L, or a solid plate, will interpose between the key-holes in K and R as the armature approaches or falls back from the magnet. The eccentric wheel Q (represented in Fig. 1 as limiting the retiring distance of the armature by adjusting the movement of the prolongation of armature-bar P, Figs. 1 and 2) permits the adjustment of the play of this bar within such limits that while the normal battery belonging to a circuit in which a box may be placed is sufficiently strong to retain the armature when placed near the face of the magnet, or to cause it to play within the limits required for all purposes of telegraphy, yet shall not be able to draw it from the considerable distance to which it would be allowed to fall when the eccentric Q is placed as intended, when the box is closed for and ready to transmit signals. A fixed stop may be used in lieu of the eccentric wheel or any form of fixed adjustment.

When a box has been wound up, as described, and the automatic machinery contained therein begins to operate, it immediately causes a break in the circuit, and, in consequence, not only the armature of this box, but those of all other boxes on the same circuit, will fall back, and, though the circuit be reclosed, the armatures will not be drawn back by the magnets unassisted by increased battery force. Hence, if any box be set in motion, the key-hole of that box, and those of all other boxes upon the same circuit, will instantly be closed, so that the key cannot be inserted, and will remain so. If, however, an auxiliary battery be for an instant thrown in, the circuit being closed, the several armatures will be instantly drawn up to the magnets, and then, if the auxiliary battery be removed, they will be retained by the normal battery belonging to that circuit.

Now, if by any apparatus at the battery depot or central office the first break caused by the operation of any box be repeated on all other circuits, and when that box has completed its functions a single flash of auxiliary voltaic force be caused to traverse rapidly the several circuits, it will happen that, when any box is operating, the key-hole of every box in the system will be closed, and no interference of signals possible, but that so soon as the said box has completed its assigned functions every box in the system will be restored to its normal condition, and will be competent to transmit signals.

The necessary telegraphing required for the surveillance and repairs of lines may be performed upon the same magnet, the prolongation P being the sounder-arm or bell-hammer, as the case may be, such telegraphing requiring no auxiliary battery, the adjustment of Q being as described. The magnet which restores the plate I to its normal position when it has fallen back, as described, by the use of an auxiliary battery, is not additional to that usually and of necessity contained in all fire-alarm boxes. These boxes may, however, be used in connection with other fire-alarm apparatus than that intended to be used in a perfected system, and under circumstances where it may not be practical or economical to use an auxiliary battery to restore the armatures to their normal conditions. In such cases the effect of non-interference may be attained as completely, so far as the box operated is concerned, as already described, and in less degree, so far as all the other boxes are concerned. In this case a wire is to be attached to the arm $D^2$, as represented by the dotted line in Fig. 1, or to $D^1$, in such form that when the machinery is at rest the prolongation of armature-bar O is restrained from falling back beyond the limit within which the battery belonging to the circuit is capable of influencing the armature. Then, if a box be operated, this wire or stopper will, in this box alone, be removed, so that O may fall completely back, thus closing the key-hole, as described. When the box has completed its revolution, the return of this stopper will again bring the armature under influence of the magnet, and no other adjustment of the play of the armature is required for any purpose. Meanwhile, in all other boxes of the same circuit, or of other circuits affected by them indirectly, the key-hole will close and open in accord with the signals sent by the actuating-box. Hence, though during this operation it would not be impossible to introduce the key, it would still be difficult to do so, as the key-hole would only be open for short intervals.

In the above-described invention, I do not claim any combination wherein a circuit-wheel is operated through the means of a reciprocating gear-sector. (Patent 92,275, of 1869.)

I do not claim the locking in or out of circuit the break-circuit wheel by any magnetic device. (Patent 113,649, of 1871.)

I do not claim the releasing of circuit-breaking mechanism by introducing a key without opening the door. (Patent 140,106, of 1873.)

But

I do claim—

1. In combination with an electric signaling apparatus, a revolving pinion or gear-wheel, which is moved directly by a key or other winding device, in combination with a gear-wheel, sector, rack, or other shaped device, connected directly with the driving-weight, its support or shaft connected with a spring, for the purpose of raising the weight or winding the spring, substantially as hereinbefore described.

2. In combination with any automatic electric signal apparatus, a cog wheel, pinion, or equivalent device, revolving and sliding to and fro upon either a fixed or movable shaft, to be turned by means of a key or equivalent implement, the end of which engages in slots or obstacles provided therefor on the end of the said pinion, for the purpose of winding up weights or springs, substantially as hereinbefore described.

3. The combination of an independent pinion or equivalent device with a wheel, sector, or rack, and a key or equivalent implement which may pass through an orifice in a closed door, for the purpose of winding a spring or raising a weight.

4. The arrangement of ratchet-wheel or equivalent device in the closed door or cover, to prevent the key from being turned except in one direction, substantially in the manner and for the purposes hereinabove set forth.

5. In combination with any inclosed rotating device to be operated by a key, the combination of a slotted movable shaft, F, spring or equivalent retaining-pin $e$, and slotted wheel R, to render a peculiarly-shaped key necessary to operate the combination, substantially in the manner and for the purposes hereinbefore described.

6. The combination of a swinging plate or equivalent device with a magnet placed within a closed box, to close and open a key-hole or orifice in said box at certain desired times, substantially in the manner and for the purposes as hereinbefore described.

7. The combination of magnet, armature-bar, and any device for closing the key-hole of the signal-box connected therewith, and to be moved thereby, with telegraph-line having connections with more than one series of batteries, so that when the apparatus is in circuit with the lesser battery the magnet shall be competent to hold the armature against its face, and retain the movable device in one fixed position so long as the circuit remains unbroken; but if the armature-bar be, by any cause, removed to its extreme reverse position, thus carrying with it the movable device to a second or third position, the magnet will not be competent to withdraw the armature-bar from said reverse position until the said lesser or normal battery be temporarily augmented by the addition of extra series of battery therefor provided.

STEPHEN CHESTER.

Witnesses:
 D. ORMOND FRYE,
 JOHN GUION.